US011151256B2

(12) United States Patent
Martinez et al.

(10) Patent No.: US 11,151,256 B2
(45) Date of Patent: Oct. 19, 2021

(54) DETECTING SECURITY THREATS BY MONITORING CHAINS OF CONFIGURATION CHANGES MADE TO BASIC INPUT/OUTPUT SYSTEM (BIOS) OR UNIFIED EXTENSIBLE FIRMWARE INTERFACE (UEFI) ATTRIBUTES

(71) Applicant: Dell Products, L.P., Round Rock, TX (US)

(72) Inventors: Ricardo L. Martinez, Leander, TX (US); Girish S. Dhoble, Austin, TX (US); Nicholas D. Grobelny, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 354 days.

(21) Appl. No.: 16/410,807

(22) Filed: May 13, 2019

(65) Prior Publication Data

US 2020/0364342 A1 Nov. 19, 2020

(51) Int. Cl.
*G06F 21/57* (2013.01)
*G06F 21/50* (2013.01)
*G06F 21/55* (2013.01)
*G06F 9/4401* (2018.01)

(52) U.S. Cl.
CPC ............ *G06F 21/575* (2013.01); *G06F 9/441* (2013.01); *G06F 21/50* (2013.01); *G06F 21/55* (2013.01); *G06F 21/572* (2013.01)

(58) Field of Classification Search
CPC ................................................ G06F 21/50–577
See application file for complete search history.

(56) References Cited

U.S. PATENT DOCUMENTS

| | | |
|---|---|---|
| 2011/0099627 A1 | 4/2011 | Proudler |
| 2012/0017073 A1 | 1/2012 | Gillespie |
| 2013/0013905 A1 | 1/2013 | Held et al. |
| 2014/0304520 A1* | 10/2014 | Bobzin ............... G06F 21/572 713/187 |
| 2016/0314002 A1 | 10/2016 | Khatri et al. |
| 2019/0012465 A1* | 1/2019 | Kim .................... G06F 21/552 |

OTHER PUBLICATIONS

Grill, Bernhard. Bootkits revisited; detecting, analysing and mitigating bootkit threats. Diss. Wien, 2016. (Year: 2016).*

(Continued)

*Primary Examiner* — Madhuri R Herzog
(74) *Attorney, Agent, or Firm* — Fogarty LLP

(57) ABSTRACT

Systems and methods for detecting IHS attacks by monitoring chains of configuration changes made to Basic Input/Output System (BIOS) or Unified Extensible Firmware Interface (UEFI) attributes are described. In some embodiments, an IHS may include a processor and a memory coupled to the processor, the memory having program instructions stored thereon that, upon execution by the processor, cause the IHS to: monitor a chain of BIOS/UEFI configuration changes; compare the chain of BIOS/UEFI configuration changes against an Indication of Attack (IoA); and report an alert in response to the chain of BIOS/UEFI configuration changes matching the IoA.

19 Claims, 7 Drawing Sheets

(56) References Cited

OTHER PUBLICATIONS

Butterworth, John, et al. "Bios chronomancy: Fixing the core root of trust for measurement." Proceedings of the 2013 ACM SIGSAC conference on Computer & Communications Security. 2013. (Year: 2013).*

International Search Authority (ISA), "International Search Report," International Application No. PCT/US2020/031901, dated Aug. 6, 2020, 2 pages, publisher Commissioner for Patents—PCT, Alexandria, Virginia, United States of America.

International Search Authority (ISA), "Written Opinion of the International Searching Authority," International Application No. PCT/US2020/031901, dated Aug. 6, 2020, 9 pages, publisher Commissioner for Patents—PCT, Alexandria, Virginia, United States of America.

Regenscheid, et al., "BIOS Integrity Measurement Guidelines" (NIST Special Publication (SP) 800-155 (Draft)), National Institute of Standards and Technology, Dec. 7, 2011, [retrieved on Jun. 15, 2020], 47 pages, Retrieved from the Internet: <https://csrc.nist.gov/csrc/media/publications/sp/800-155/draft/documents/draft-sp800-155_dec2011.pdf.

Dell Inc., Dell Command / Configure Version 4.1.0 Command Line Interface Reference Guide, Dell, Inc., May 14, 2018, [retrieved on Jun. 18, 2020], 121 pages, Retrieved from the Internet: <https://topics-cdn.dell.com/pdf/command-configure-v41_reference-guide_en-us.pdf.

* cited by examiner

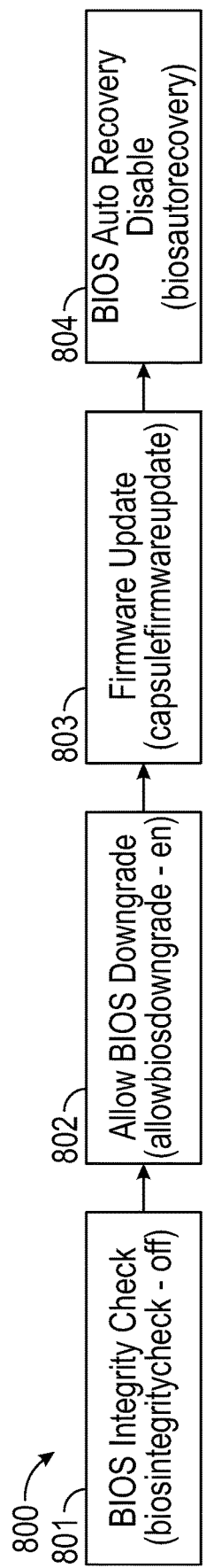
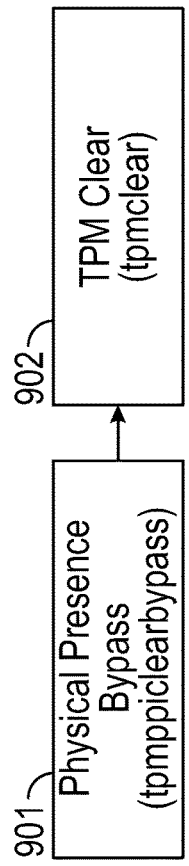
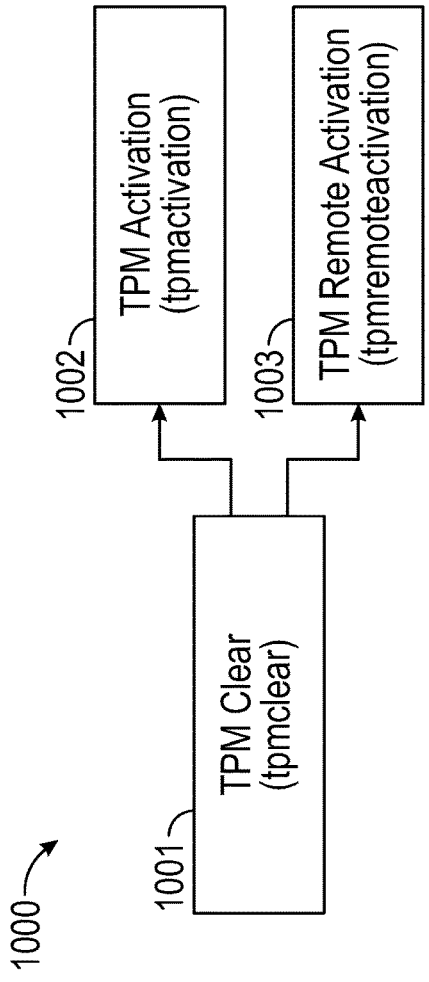
FIG. 8
FIG. 9
FIG. 10

DETECTING SECURITY THREATS BY MONITORING CHAINS OF CONFIGURATION CHANGES MADE TO BASIC INPUT/OUTPUT SYSTEM (BIOS) OR UNIFIED EXTENSIBLE FIRMWARE INTERFACE (UEFI) ATTRIBUTES

FIELD

The present disclosure generally relates to Information Handling Systems (IHSs), and, more particularly, to systems and methods for detecting security threats by monitoring chains of configuration changes made to Basic Input/Output System (BIOS) or Unified Extensible Firmware Interface (UEFI) attributes.

BACKGROUND

As the value and use of information continue to increase, individuals and businesses seek additional ways to process and store it. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Computer security, also known as cybersecurity, refers to the protection of IHSs from theft or damage to hardware, software, and/or electronic data. In this context, a threat is a possible danger that may exploit an IHS's vulnerability to breach its security and therefore cause harm. Nowadays, many security threats to both consumer and commercial IHSs require the adversary to modify the configuration of the IHS at the Basic Input/Output System (BIOS) or Unified Extensible Firmware Interface (UEFI) level.

SUMMARY

Embodiments of systems and methods for detecting security threats by monitoring chains of configuration changes made to Basic Input/Output System (BIOS) or Unified Extensible Firmware Interface (UEFI) attributes are described. In some illustrative, non-limiting embodiments, an IHS may include a processor and a memory coupled to the processor, the memory having program instructions stored thereon that, upon execution by the processor, cause the IHS to: monitor a chain of BIOS/UEFI configuration changes; compare the chain of BIOS/UEFI configuration changes against an Indication of Attack (IoA); and report an alert in response to the chain of BIOS/UEFI configuration changes matching the IoA.

To monitor the chain of BIOS/UEFI configuration changes, the program instruction, upon execution, may cause the IHS to access a non-volatile memory (NVM) where BIOS configuration attributes are stored. In some cases, the chain of BIOS/UEFI configuration changes may include at least a first configuration change having a first timestamp followed by a second configuration change having a second timestamp.

The IoA may include at least a third configuration change followed by a fourth configuration change, and the program instructions, upon execution, may cause the IHS to compare: (i) the first configuration change against the third configuration change, and (ii) the second configuration change against the fourth configuration change, and where the chain of BIOS/UEFI configuration changes matches the IoA, in part, when: (i) the first configuration change is equal to the third configuration change, and (ii) the second configuration change is equal to the fourth configuration change.

Additionally, or alternatively, the IoA may include a time interval between the third and fourth configuration changes, and the program instructions, upon execution, may cause the IHS to: compare a time difference between the second timestamp and the first timestamp against the time interval, and where the chain of BIOS/UEFI configuration changes matches the IoA, in part, when the time difference is equal to or less than the time interval.

In some cases, a chain of BIOS/UEFI configuration changes may include: a disabling of BIOS signing, followed by an enabling of BIOS downgrade, followed by a disabling of BIOS auto-recovery, followed by an enabling of BIOS auto-recovery, followed by a disabling of BIOS downgrade, and followed by an enabling of BIOS signing. Additionally, or alternatively, the chain of BIOS/UEFI configuration changes may include: selecting a legacy boot option from a boot list, followed by a disabling of secure boot, followed by an attempt to perform a legacy boot. Additionally, or alternatively, the chain of BIOS/UEFI configuration changes may include: selecting a Secure Digital (SD) boot option, a Thunderbolt boot option, or a Universal Serial Bus (USB) boot option from a boot list, followed by the adding of a boot device to the boot list. Additionally, or alternatively, the chain of BIOS/UEFI configuration changes may include: disabling boot path security, followed by at least one of: disabling a secure boot, or attempting a legacy boot. Additionally, or alternatively, the chain of BIOS/UEFI configuration changes may include: disabling of a BIOS integrity check, followed by an enabling of BIOS downgrade, followed by a firmware update, followed by a disabling of BIOS auto-recovery.

Additionally, or alternatively, the chain of BIOS/UEFI configuration changes may include: bypassing physical presence requirement for a Trusted Platform Module (TPM) clearing operation, followed by an a TPM clearing operation. Additionally, or alternatively, the chain of BIOS/UEFI configuration changes may include: allowing a TPM clearing operation, followed by at least one of: allowing a local TPM activation, or allowing a remote TPM activation operation. Additionally, or alternatively, the chain of BIOS/UEFI configuration changes may include: enabling an auto-on feature, an auto-on wake-on-LAN feature, an USB-wake feature, or a wake-on-Dock feature, followed by at least one of: (i) allowing a BIOS downgrade followed by a firmware update operation, (ii) allowing a remote TPM activation operation, or (iii) allowing a remote wipe of an internal drive.

Additionally, or alternatively, the chain of BIOS/UEFI configuration changes may include: enabling an auto-on feature, an auto-on wake-on-LAN feature, an USB-wake feature, or a wake-on-Dock feature, followed by at least one of: (i) allowing a BIOS downgrade followed by a firmware update operation, or (ii) allowing a remote TPM activation operation. Additionally, or alternatively, the chain of BIOS/ UEFI configuration changes may include: enabling a microphone or camera, followed by an auto-on microphone or camera setting. Additionally, or alternatively, the chain of BIOS/UEFI configuration changes may include: changing a minimum length of an admin password, followed by a disabling of a strong password feature, followed by an admin password change.

Additionally, or alternatively, the chain of BIOS/UEFI configuration changes may include: an admin password change, followed by an enabling of an admin setup lockout feature. Additionally, or alternatively, the chain of BIOS/ UEFI configuration changes may include: clearing an intrusion warning, followed by a chassis intrusion reset.

In another illustrative, non-limiting embodiment, a hardware memory device may have program instructions stored thereon that, upon execution by a processor of an IHS, cause the IHS to: monitor a chain of BIOS/UEFI configuration changes; compare the chain of BIOS/UEFI configuration changes against an IoA; and report an alert in response to the chain of BIOS/UEFI configuration changes matching the IoA.

In yet another illustrative, non-limiting embodiment, a method may include: monitoring a chain of BIOS/UEFI configuration changes; comparing the chain of BIOS/UEFI configuration changes against an IoA; and report an alert in response to the chain of BIOS/UEFI configuration changes matching the IoA.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 8 is an example of an IoA related to a BIOS update threat, according to some embodiments.

FIGS. 9 and 10 are examples of IoAs related to Trust Platform Module (TPM) threats, according to some embodiments.

DETAILED DESCRIPTION

Figure 1:
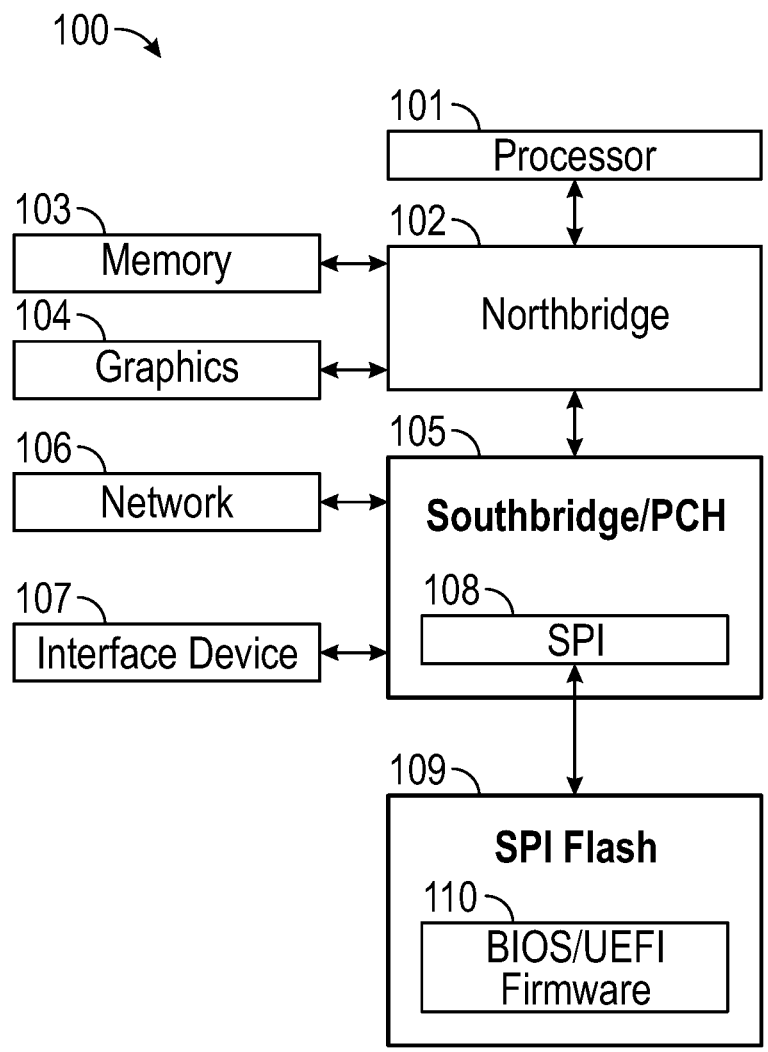
FIG. 1 is a block diagram depicting certain components of an Information Handling System (IHS) configured for detecting security threat by monitoring chains of configuration changes made to Basic Input/Output System (BIOS) or Unified Extensible Firmware Interface (UEFI) attributes, according to some embodiments.

Certain types of security attacks require an adversary to modify the configuration of an Information Handling System (IHS) at the Basic Input/Output System (BIOS) or Unified Extensible Firmware Interface (UEFI) level. In fact, sophisticated attacks may require configuration changes to two or more BIOS/UEFI attributes in a specific order, such that detecting any given BIOS/UEFI attribute change in isolation would not protect the IHS. To address these, and other problems, systems and method described herein provide a threat modeling perspective and platform-level security to define strings or chains of BIOS/UEFI configuration changes that can be used by security software as Indicators of Attack (IoAs).

In some embodiments, a system agent on the IHS may be configured to monitor all changes to BIOS/UEFI configuration attributes, and to compare current and historical configuration changes to pre-defined IoAs to find a match. IoAs may be generated beforehand, for example, by understanding advanced adversaries, platform threat models, and customer security. In some cases, IoAs may be used by third-party security software vendors for inclusion in their own IoA filters.

A reporting module may be configured to alert an administrator, a security operations center, or the IHS's user in situations where a detected chain of BIOS/UEFI configuration changes matches a pre-defined IoA. Detection confidence may be measured and monitored, for example, based upon number of configuration changes that match corresponding changes prescribed by a given IoA. In some implementations, a machine learning module may be employed for creating new IoAs and maintaining existing IoAs.

Accordingly, systems and methods described herein may provide an adversarial and threat-based approach to defining and describing dangerous combinations of BIOS/UEFI configuration changes. These techniques also provide a description and delivery of specific combinations of configuration changes as IoAs, as well as risk and confidence rating of partial or full chains of BIOS/UEFI configurations for IoA detection, reporting, and/or alerting.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 illustrates an example of components of IHS 100 configured to detect security threat by monitoring chains of configuration changes made to BIOS/UEFI attributes, according to some embodiments. As illustrated, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

Processor 101 may be accessed via northbridge 102 chip or integrated circuit (IC) that provides an interface via a QuickPath Interconnect (QPI) or front side bus. Northbridge 102 also provides access to system memory 103 that may be configured to store program instructions and/or data accessible by processor 101. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD).

Northbridge 102 may also provide access to graphics processor 104. In certain embodiments, graphics processor 104 may be part of one or more video or graphics cards installed as components of IHS 100. Graphics processor 104 may be coupled to northbridge 102 via a graphics bus such as provided by an AGP (Accelerated Graphics Port) bus or a PCIe (Peripheral Component Interconnect Express) bus. In certain embodiments, a graphics processor 104 generates display signals and provides them to a monitor or other display device.

IHS 100 includes Platform Controller Hub (PCH) or southbridge chipset 105, which may comprise one or more ICs coupled to northbridge 102. In certain embodiments, PCH 105 provides processor 101 with access to a variety of resources. For instance, PCH 105 may be coupled to network interface 106, such as a Network Interface Controller (NIC). In certain embodiments, network interface 106 may be coupled to PCH 105 via a PCIe bus or the like, and it may support communication via various wired and/or wireless networks. User interface device(s) 107 may include a keyboard, trackpad, camera, remote control, or any other device configured to enable a human user to interact with IHS 100.

In various embodiments, SPI Flash 109 may be coupled to PCH 105 over an SPI bus. SPI Flash 109 may be a non-volatile memory (NVM) device capable of being electrically erased and reprogrammed. SPI Flash 109 may be divided into various partitions with each partition storing instructions and/or data for a different component of IHS 100.

As shown, a partition of SPI Flash 109 may store BIOS/UEFI firmware instructions 110. Upon execution by processor 101, BIOS/UEFI instructions 110 provide an abstraction layer that allows the IHS's OS to interface with certain hardware components that are utilized by IHS 100. The Unified Extensible Firmware Interface (UEFI) was designed as a successor to BIOS; many modern IHSs utilize UEFI in addition to or instead of a BIOS. As used herein, BIOS is also intended to encompass UEFI.

Particularly, upon the booting of IHS 100, processor 101 may utilize BIOS/UEFI instructions 110 to initialize and test hardware components coupled to IHS 100 and to load an OS for use by IHS 100. As part of the boot process, BIOS/UEFI instructions 110 enable a local or remote user to make configuration changes to a number of IHS components and processes by modifying the values of one or more BIOS/UEFI configuration attributes. These BIOS/UEFI configuration attributes are stored in an NVM and made accessible to the IHS's OS via a suitable configuration interface.

In various embodiments, IHS 100 may not include each of the components shown. Additionally, or alternatively, IHS 100 may include components other than those that are shown (e.g., additional storage and user interface devices, Super I/O controllers, USB ports, etc.). For example, in some cases, a cryptographic module may be implemented as an FPGA, or as other hardware logic coupled to PCH 105. An example of cryptographic hardware module is the Trusted Platform Module, or TPM. Furthermore, some of the components that are represented as separate components may, in some implementations, be integrated with other components. In various embodiments, all or a portion of the operations performed by the illustrated components may instead be performed by components integrated into processor 101 as a system-on-a-chip (SOC) or the like.

Figure 2:
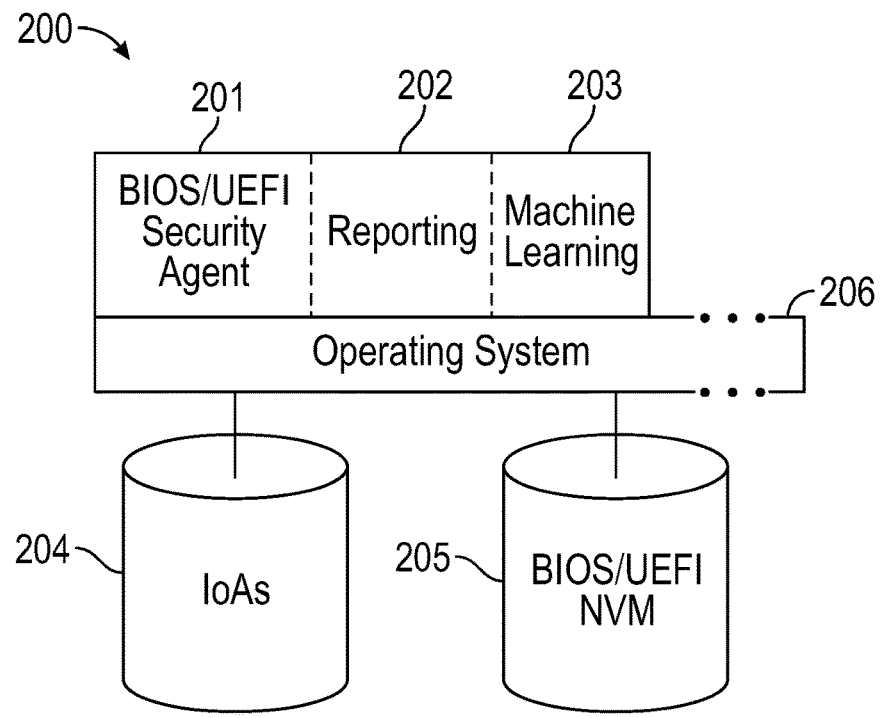
FIG. 2 is a block diagram depicting components of a BIOS/UEFI security agent configured to detect security threats by monitoring chains of configuration changes made to BIOS/UEFI attributes, according to some embodiments.

FIG. 2 is a block diagram depicting components of BIOS/UEFI security agent 201 configured to detect security threats by monitoring chains of configuration changes made to BIOS/UEFI attributes, according to some embodiments. In this implementation, stack 200 includes OS 206, a system software that manages IHS hardware and software resources and provides common services for applications, such as BIOS/UEFI security agent 201.

Particularly, OS 206 may schedule tasks for efficient use of IHS 100, and it may also perform cost allocation of processor time, mass storage, printing, and other resources. For hardware operations such as input and output and memory allocation, OS 206 behaves as an intermediary between programs and hardware components. Examples of suitable types of OS 206 include WINDOWS, MACOS, LINUX, and others.

BIOS/UEFI security agent 201 includes program instructions that, upon execution, performs methods for detecting security threats by monitoring chains of configuration changes made to BIOS/UEFI attributes stored in NVM 205 (e.g., a partition of SPI Flash 109). In some implementations, BIOS/UEFI security agent 201 may further include reporting module 202 and machine learning module 203. Reporting module 202 includes program instructions that, upon execution, issues alerts, reports, and/or notifications to an administrator or the user about a detected BIOS/UEFI attack. Meanwhile, machine learning module 203 includes program instructions that, upon execution, creates, modifies, and maintains IoAs in database 204 (e.g., on a Hard Drive).

Each IoA in database 204 may include a sequence of two or more BIOS/UEFI configuration changes that, if detected in that particular order, may be indicative of a threat or attack. Each BIOS/UEFI configuration change may be represented by a modification to an attribute (e.g., a binary flag, a selection from a list, etc.) associated with the BIOS/UEFI configuration and stored in NVM 205.

In some cases, NVM 205 may store historical values for BIOS/UEFI configuration attributes as they change over time. In other cases, NVM may retain only the currently set value for each BIOS/UEFI configuration attribute, and BIOS/UEFI security agent 201 may keep a log of those historical changes upon accessing NVM 205 (e.g., through OS 206 upon completion of a boot process) in a look-up table (LUT), database, or the like. As BIOS/UEFI security agent 201 collects historical configuration changes and other parameters (e.g., same boot, timestamp, etc.) associated with those changes, BIOS/UEFI security agent 201 monitors chains of BIOS/UEFI configuration changes being made by a local or remote user, for example.

With respect to parameters collected concurrently with attribute changes, in some cases, a given BIOS/UEFI configuration change may be associated with a "boot number"

value that indicates, with respect to a preceding BIOS/UEFI configuration change, whether the given change must be made in the same boot cycle, in a subsequent boot cycle, within a number of boot cycles, or after a number of boot cycles of IHS 100, in order for an attack to match a particular IoA. Additionally, or alternatively, an IoA may include a time interval between a first BIOS/UEFI configuration change and a second BIOS/UEFI configuration change, such that, in order to an attack to match that IoA, the second change must be made within the time interval or after the time interval. Concurrently with the detection of BIOS/UEFI attribute value changes, a timestamp associated with each such change may also be stored and evaluated.

Figure 3:
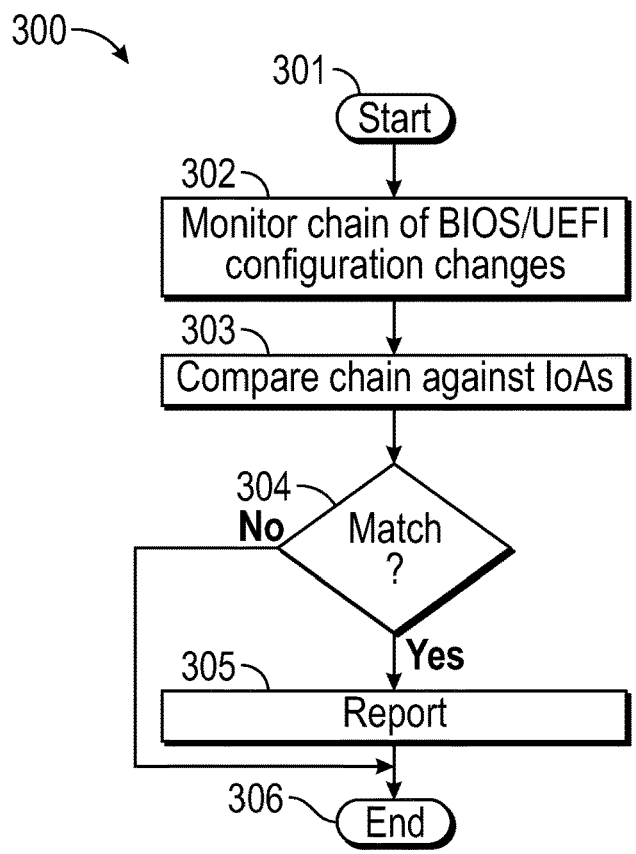
FIG. 3 is a block diagram of a method for detecting security threats by monitoring chains of configuration changes made to BIOS/UEFI attributes, according to some embodiments.

FIG. 3 is a block diagram of method 300 for detecting security threats by monitoring chains of configuration changes made to BIOS/UEFI attributes. In some embodiments, method 300 may be performed by BIOS/UEFI security agent 201 upon execution by processor 101. Particularly, method 300 begins at block 301. At block 302, method 300 monitors chains of BIOS/UEFI configuration changes made to IHS 100.

For example, as noted above, BIOS/UEFI security agent 201 may retrieve current BIOS/UEFI configuration attribute values from NVM 205 through OS 206. Then, BIOS/UEFI security agent 201 may store the current values in an LUT of historical attribute values. Each entry in the LUT or database may represent a change to BIOS/UEFI configuration attributes being performed over time. In addition to an indication of the attribute identification and/or the attribute value itself, each node or link in a chain of BIOS/UEFI configuration changes may also include a timestamp and/or a boot number value of when the change was made.

Block 303 compares IoAs stored in database 204 against historical BIOS/UEFI configuration changes, and block 304 determines whether a particular IoA has a match. In some cases, if a chain of BIOS/UEFI configuration changes exactly matches a sequence of configuration changes of a particular IoA, a threat may be detected. In other cases, the match may be identified only if the time intervals and/or number of boots between BIOS/UEFI configuration changes in the chain also match time intervals and/or number of boots between corresponding configuration changes in that particular IoA.

In other cases, rather of relying on exact matches, block 304 may detect a threat in response to a chain of configuration changes matching a smaller portion of an entire IoA. For example, if a chain of BIOS/UEFI configuration attribute value changes matches an IoA, but the timestamps associated with those changes are outside the range of the time intervals specified in the IoA, block 304 may calculate a detection confidence score (e.g., a %) based upon how many IoA parameters are matched by the chain of BIOS/UEFI configuration changes, with selectable weights for different types of parameters (e.g., attribute changes, time intervals, and/or boot numbers).

Still referring to block 304, assume that a chain of BIOS/UEFI configuration changes includes a first configuration change having a first timestamp followed by a second configuration change having a second timestamp. Meanwhile, an IoA includes a third configuration change followed by a fourth configuration change. As such, block 304 may compare: (i) the first configuration change against the third configuration change, and (ii) the second configuration change against the fourth configuration change. In this case, chain of BIOS/UEFI configuration changes matches the IoA when: (i) the first configuration change is equal to the third configuration change, and (ii) the second configuration change is equal to the fourth configuration change.

If the IoA also defines a time interval between the third and fourth configuration changes, block 304 may compare a time difference between the second timestamp and the first timestamp against the time interval, and it may determine that the chain of BIOS/UEFI configuration changes matches the IoA when the time difference is equal to or less than the time interval. Alternatively, block 304 may determine that the chain of BIOS/UEFI configuration changes matches the IoA when the time difference is equal to or greater than the time interval.

Moreover, if the IoA further define a number of boots between the third and fourth configuration changes, block 304 may compare that values against number of boots between the first and second configuration changes, and it may determine that the chain of BIOS/UEFI configuration changes matches the IoA when the number of boots is met (e.g., equal to, smaller than, or greater than).

At block 305, if an IoA has been exactly (or approximately) matched to a chain of BIOS/UEFI configuration changes, method 300 may cause reporting module 202 to issue an alert or report (e.g., an email, a text message, etc.) with details about the potential threat to a systems administrator or the like. For example, block 305 may report the name of the matched IoA or threat and/or a confidence store associate with an approximate match. In some cases, reporting module 202 may provide a visual comparison between the detected chain of BIOS/UEFI configuration changes and the matched IoA via a Graphical User Interface (GUI). For threats that originate remotely, the IHS user may also be notified. Moreover, in addition to reporting the detected threat or IoA match, reporting module 202 may be configured to issue a command to OS 206 to take a selected corrective action, such as logging a local or remote user out of IHS 100, shutting down the IHS, applying stricter security or data protection protocols to an ongoing user session, etc. Method 300 ends at block 306; but otherwise it may be repeated continuously or periodically (e.g., upon completion of each boot process).

Figure 4:
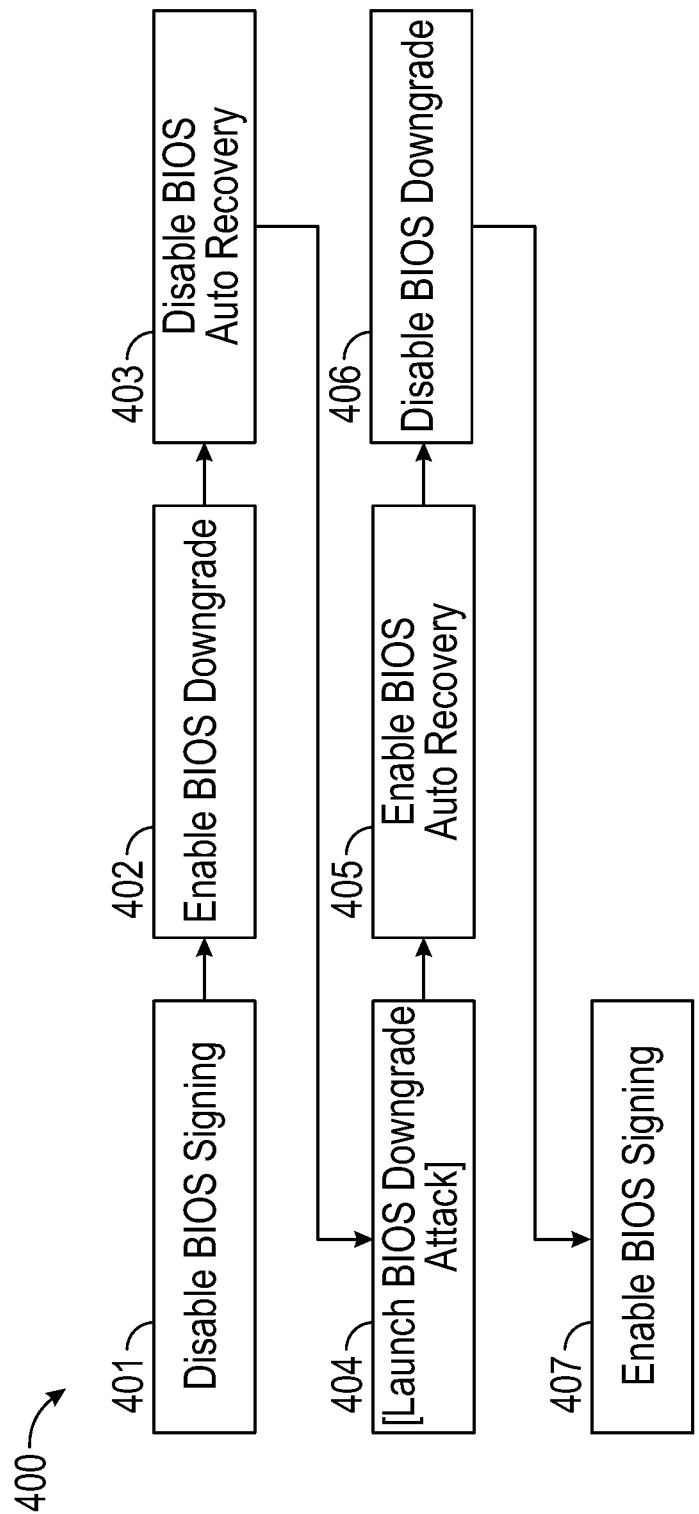
FIG. 4 is an example of a chain of configuration changes made to BIOS/UEFI attributes as part of an attack, according to some embodiments.

FIG. 4 is an example of a chain of configuration changes made to BIOS/UEFI attributes as part of attack scenario 400, according to some embodiments. In attack scenario 400, an attacker performs a downgrade attack on the BIOS, potentially taking advantage of a vulnerability patched in the latest BIOS. Once the attack has been performed and customer damage done, the attacker reverts all changes to attempt to avoid detection.

Particularly, at block 401, a user disables BIOS signing by changing the value of that attribute from enabled to disabled. At block 402, the user enables BIOS downgrade by changing the value of that attribute from disabled to enabled. At block 403, the user disables BIOS AutoRecovery by changing the value of that attribute from enabled to disabled. Then, at block 404, the user launches a BIOS downgrade attack.

At block 405, after the attack is completed, the user enables BIOS AutoRecovery by changing the value of that attribute from disabled to enabled. At block 406, the user disables BIOS downgrade by changing the value of that attribute from enabled to disabled. Finally, at block 407, the user enables BIOS singing by changing the value of that attribute from disabled to enabled.

In various embodiments, BIOS/UEFI security agent 201 may capture the events of attack scenario 400 as a chain of BIOS/UEFI configuration changes and various associated parameters (e.g., timestamps, number of boots between events, etc.). Then, BIOS/UEFI security agent 201 may compare the chain of BIOS/UEFI configuration changes against corresponding changes outlined in one or more IoAs.

In the implementations depicted in FIGS. 5-16, various example IoAs have been grouped into the following categories of security threats: boot threats, BIOS update threats, TPM threats, remote threats, authentication threats, and log tampering threats. It should be understood, however, that other categories may be used, and that certain IoAs may outline BIOS/UEFI configuration changes across different categories of security threats. Moreover, longer IoAs may be created (manually or by operation of machine learning module 203) by tying two or more IoAs in any suitable way to match new or developing security threats.

Figure 5:
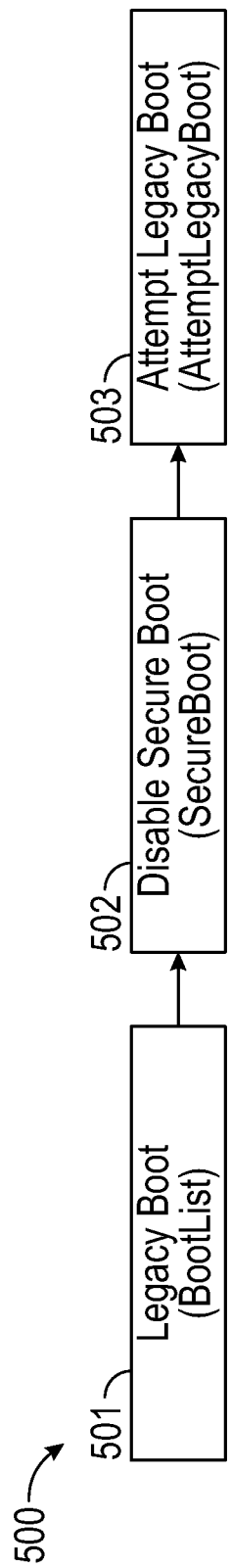
FIGS. 5-7 are examples of Indicators of Attack (IoAs) related to boot threats, according to some embodiments.
Figure 6:
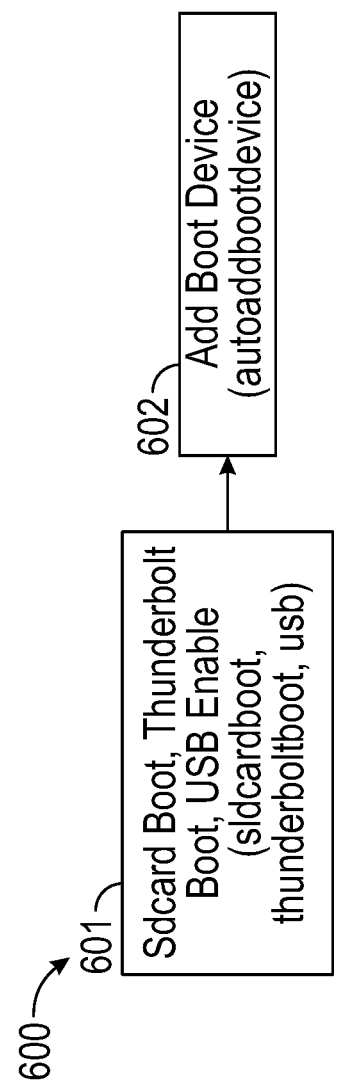
Figure 7:
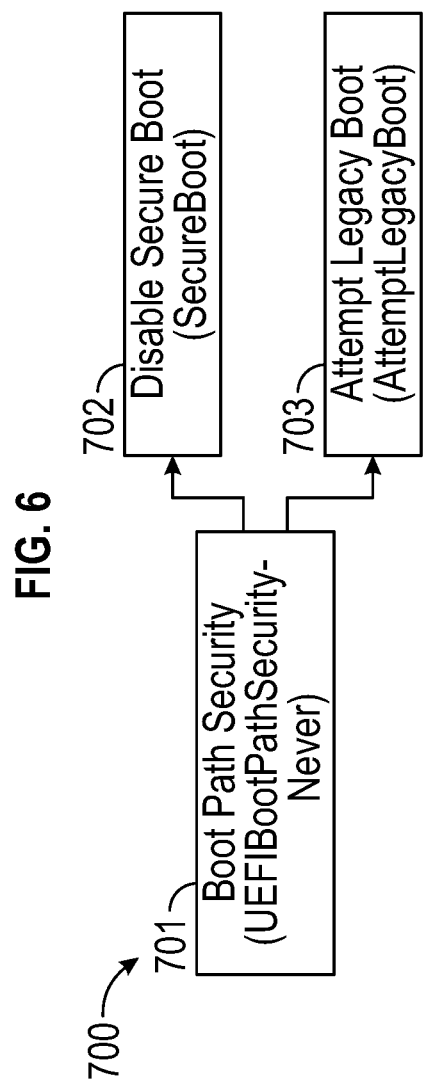

FIGS. 5-7 are examples of Indicators of Attack (IoAs) representative of boot threats, according to some embodiments. At block 501 of IoA 500, a user selects a legacy boot option from a boot list. At block 502, the user disables SecureBoot by changing the value of that attribute from enabled to disabled. Then, at block 503, the user attempts to perform a legacy boot. With respect to IoA 600, at block 601 a user selects a Secure Digital (SD) boot option, a Thunderbolt boot option, or a Universal Serial Bus (USB) boot option from a boot list. Then, at block 602, the user adds a boot device to the boot list. As to IoA 700, at block 701 a user first disables boot path security by changing the value of that attribute from always to never, or from enabled to disabled. Then, at block 702, the user disables UEFI Secure Boot by changing the value of that attribute from enabled to disabled. Otherwise, at block 703, the user attempts a legacy boot.

FIG. 8 is an example of an IoA representative of a BIOS update threat, according to some embodiments. At block 801 of IoA 800, a user disables a BIOS integrity check feature by changing the value of that attribute from enabled to disabled. At block 802, the user allows BIOS downgrade by changing the value of that attribute from disabled to enabled. At block 803, the user performs a BIOS/UEFI firmware update or recovery operation. Then, at block 804, the user disables BIOS AutoRecovery by changing the value of that attribute from enabled to disabled.

FIGS. 9 and 10 are examples of IoAs representative of TPM threats, according to some embodiments. At block 901 of IoA 900, a user bypasses a physical present required for manipulating TPM or cryptographic module 124 by changing the value of that attribute. Then, a block 902, the user performs a TPM clearing operation. At block 1001 of IoA 1000, a user performs a TPM clearing operation. Then, at block 1002, the user performs a local TPM activation. Alternatively, at block 1003, a remote TPM activation operation is performed by a remote user (with respect to IHS 100).

Figure 11:
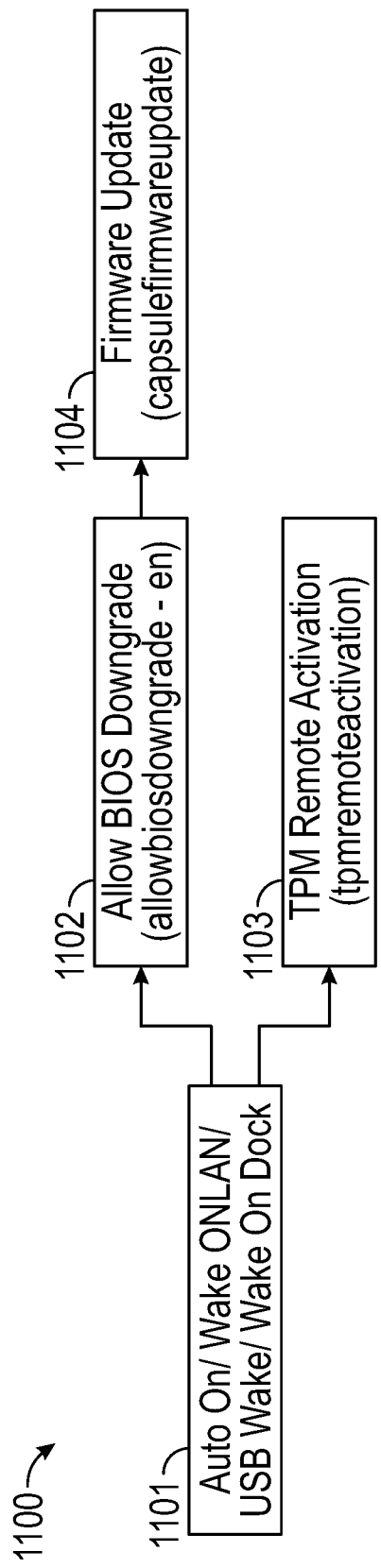
FIGS. 11-13 are examples of IoAs related to remote threats, according to some embodiments.
Figure 12:
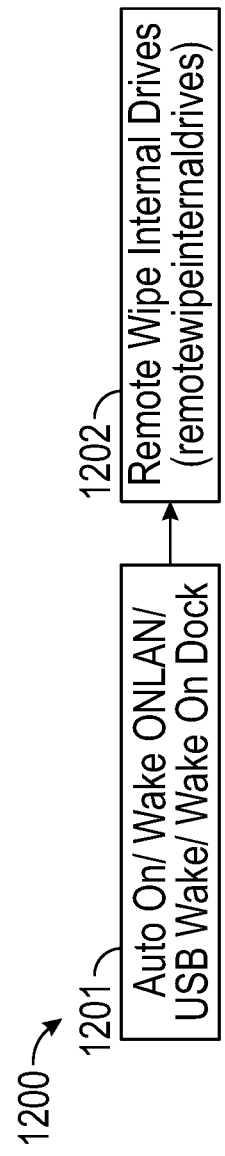
Figure 13:
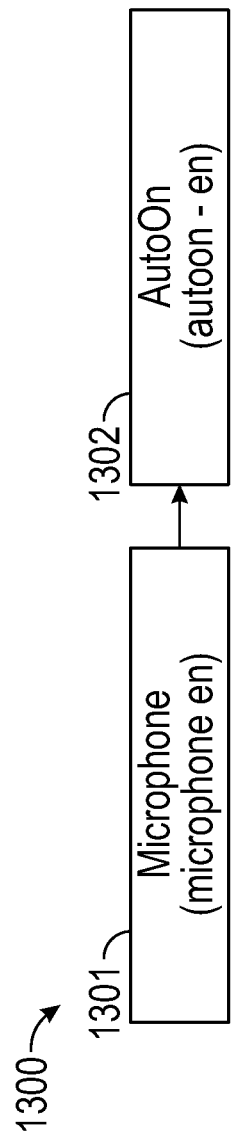

FIGS. 11-13 are examples of IoAs representative of remote threats, according to some embodiments. At block 1101 of IoA 1100, a user enables an auto-on feature, an auto-on wake-on-LAN feature, an USB-wake feature, or a wake-on-Dock feature. At block 1102, the user enables BIOS downgrade by changing the value of that attribute from disabled to enabled, and at block 1103, the user performs a BIOS/UEFI firmware update or recovery operation. Alternatively, at block 1103, a remote user performs a TPM remote activation operation. At block 1201 of IoA 1200, a user enables an auto-on feature, an auto-on wake-on-LAN feature, an USB-wake feature, or a wake-on-Dock feature. Then, at block 1202, the user enables remote wiping of the IHSs internal drives. At block 1301 of IoA 1300, a user enables a microphone or camera. Then at 1302, the user enables an auto-on microphone or camera setting.

Figure 14:
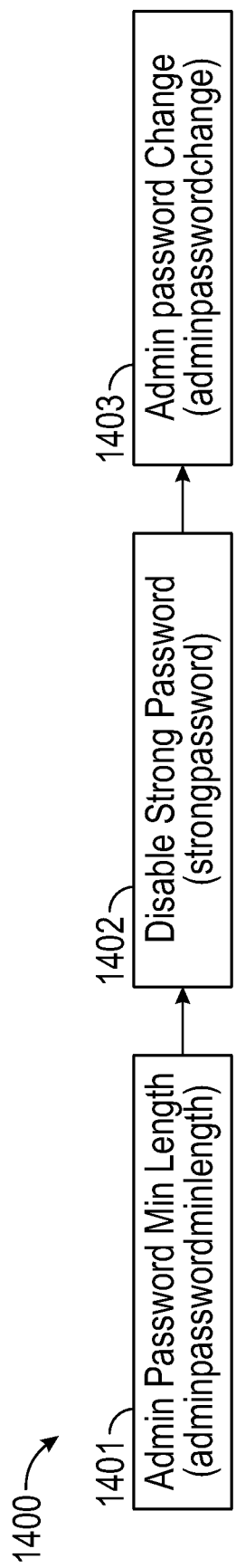
FIGS. 14 and 15 are examples of IoAs related to authentication threats, according to some embodiments.
Figure 15:
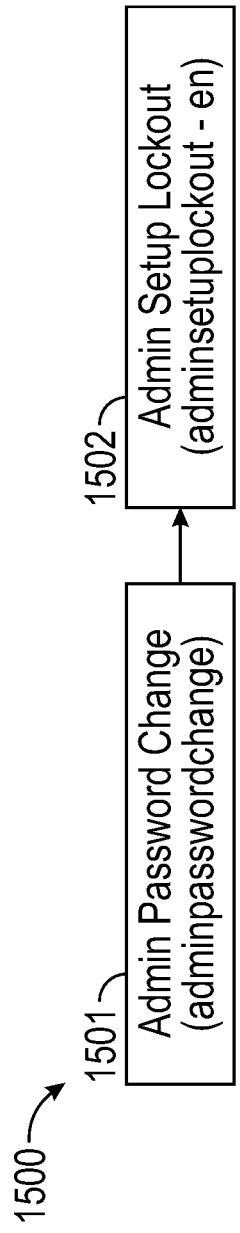

FIGS. 14 and 15 are examples of IoAs representative of authentication threats, according to some embodiments. At block 1401 of IoA 1400, a user changes a minimum length of an administrator's password. At block 1402, the user disables a strong password feature. Then, at block 1403, the user changes the administrator's password. At block 1501 of IoA 1500, a user changes the administrator's password. Then, at block 1502, the user enables of an admin setup lockout feature.

Figure 16:
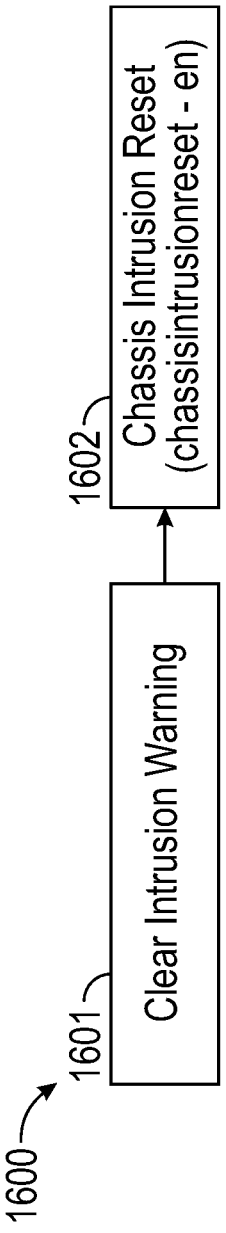
FIG. 16 is an example of an IoA related to a log tampering threat, according to some embodiments.

FIG. 16 is an example of an IoA representative of a log tampering threat, according to some embodiments. At block 1601 of IoA 1600, a user clears an intrusion warning or flag (e.g., BIOS log, power log, thermal log, or RAM error log). Then, at block 1602, the user resets a chassis intrusion flag.

It should be emphasized that IoAs 500-1600 are non-limiting examples, and that many other IoAs may employed. In some cases, machine learning module 203 of BIOS/UEFI security module 201 apply a suitable machine learning algorithm upon IoA data to determine how configuration changes are actually happening in the field (e.g., to discover relevant time intervals or boot numbers between changes). Additionally, or alternatively, machine learning module 203 may be apply a suitable machine learning algorithm upon threat data to automatically discover and curate new IoAs based upon collections of observed threats and attacks. Additionally, or alternatively, machine learning module 203 may be apply a suitable machine learning algorithm upon IoA or threat data related to clusters of multiple IHSs to devise IoAs that are relevant to an entire enterprise, or collections of enterprises.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
monitor a chain of Basic Input/Output System (BIOS)/Unified Extensible Firmware Interface (UEFI) configuration changes comprising at least an indication of a first configuration change having a first timestamp followed by a second configuration change having a second timestamp;
compare, against an Indication of Attack (IoA) comprising at least an indication of a third configuration change followed by a fourth configuration change after a time interval: (i) the first configuration change against the third configuration change, and (ii) the second configuration change against the fourth configuration change; and
report an alert in response to a determination that: (i) the first configuration change is equal to the third configuration change, (ii) the second configuration change is equal to the fourth configuration change, and (iii) a difference between the second timestamp and the first timestamp is equal to or less than the time interval.

2. The IHS of claim 1, wherein to monitor the chain of BIOS/UEFI configuration changes, the program instruction, upon execution, further cause the IHS to access a non-volatile memory (NVM) where BIOS configuration attributes are stored.

3. The IHS of claim 1, wherein the chain of BIOS/UEFI configuration changes comprises an indication of: a disablement of BIOS signing, followed by an enablement of BIOS downgrade, followed by a disablement of BIOS auto-recovery, followed by an enablement of BIOS auto-recovery, followed by a disablement of BIOS downgrade, and followed by an enablement of BIOS signing.

4. The IHS of claim 1, wherein the chain of BIOS/UEFI configuration changes comprises an indication of: a selection of a legacy boot option from a boot list, followed by a disablement of secure boot, followed by an attempt to perform a legacy boot.

5. The IHS of claim 1, wherein the chain of BIOS/UEFI configuration changes comprises an indication of: a selection of a Secure Digital (SD) boot option, a Thunderbolt boot option, or a Universal Serial Bus (USB) boot option from a boot list, followed by an addition of a boot device to the boot list.

6. The IHS of claim 1, wherein the chain of BIOS/UEFI configuration changes comprises an indication of: a disablement of boot path security, followed by at least one of: a disablement of a secure boot, or an attempt to perform a legacy boot.

7. The IHS of claim 1, wherein the chain of BIOS/UEFI configuration changes comprises an indication of: a disablement of a BIOS integrity check, followed by an enablement of BIOS downgrade, followed by a firmware update, followed by a disablement of BIOS auto-recovery.

8. The IHS of claim 1, wherein the chain of BIOS/UEFI configuration changes comprises an indication of: a bypass of a physical presence requirement for a Trusted Platform Module (TPM), followed by a TPM operation.

9. The IHS of claim 1, wherein the chain of BIOS/UEFI configuration changes comprises an indication of: an allowance of a Trusted Platform Module (TPM) clearing operation, followed by at least one of: an allowance of a local TPM activation, or an allowance of a remote TPM activation operation.

10. The IHS of claim 1, wherein the chain of BIOS/UEFI configuration changes comprises an indication of: an enablement an auto-on feature, an auto-on wake-on-Local Area Network (LAN) feature, an Universal Serial Bus (USB)-wake feature, or a wake-on-Dock feature, followed by at least one of: (i) an allowance of a BIOS downgrade followed by a firmware update operation, (ii) an allowance of a remote Trusted Platform Module (TPM) activation operation, or (iii) an allowance of a remote wipe of an internal drive.

11. The IHS of claim 1, wherein the chain of BIOS/UEFI configuration changes comprises an indication of: an enablement an auto-on feature, an auto-on wake-on-Local Area Network (LAN) feature, an Universal Serial Bus (USB)-wake feature, or a wake-on-Dock feature, followed by at least one of: (i) an allowance of a BIOS downgrade followed by a firmware update operation, or (ii) an allowance of a remote Trusted Platform Module (TPM) activation operation.

12. The IHS of claim 1, wherein the chain of BIOS/UEFI configuration changes comprises an indication of: an enablement a microphone or camera, followed by an enablement of an auto-on microphone or camera setting.

13. The IHS of claim 1, wherein the chain of BIOS/UEFI configuration changes comprises an indication of: a change to a minimum length of an admin password, followed by a disablement of a strong password feature, followed by an admin password change.

14. The IHS of claim 1, wherein the chain of BIOS/UEFI configuration changes comprises an indication of: an admin password change, followed by an enablement of an admin setup lockout feature.

15. The IHS of claim 1, wherein the chain of BIOS/UEFI configuration changes comprises an indication of: a removal of an intrusion warning, followed by a chassis intrusion reset.

16. A hardware memory device having program instructions stored thereon that, upon execution by a processor of an Information Handling System (IHS), cause the IHS to:
monitor a chain of Basic Input/Output System (BIOS)/Unified Extensible Firmware Interface (UEFI) configuration changes comprising at least an indication of a first configuration change having a first timestamp followed by a second configuration change having a second timestamp;
compare, against an Indication of Attack (IoA) comprising at least an indication of a third configuration change followed by a fourth configuration change after a time interval: (i) the first configuration change against the third configuration change, and (ii) the second configuration change against the fourth configuration change; and
report an alert in response to a determination that: (i) the first configuration change is equal to the third configuration change, (ii) the second configuration change is equal to the fourth configuration change, and (iii) a difference between the second timestamp and the first timestamp is equal to or less than the time interval.

17. A method, comprising:

monitoring a chain of Basic Input/Output System (BIOS)/Unified Extensible Firmware Interface (UEFI) configuration changes comprising at least an indication of a first configuration change having a first timestamp followed by a second configuration change having a second timestamp;

comparing, against an Indication of Attack (IoA) comprising at least at least an indication of a third configuration change followed by a fourth configuration change after a time interval: (i) the first configuration change against the third configuration change, and (ii) the second configuration change against the fourth configuration change; and reporting an alert in response to a determination that: (i) the first configuration change is equal to the third configuration change, (ii) the second configuration change is equal to the fourth configuration change, and (iii) a difference between the second timestamp and the first timestamp is equal to or less than the time interval.

18. The hardware memory device of claim 16, wherein the chain of BIOS/UEFI configuration changes comprises an indication of at least one of:

(a) a disablement of BIOS signing, followed by an enablement of BIOS downgrade, followed by a disablement of BIOS auto-recovery, followed by an enablement of BIOS auto-recovery, followed by a disablement of BIOS downgrade, and followed by an enablement of BIOS signing;

(b) a selection of a legacy boot option from a boot list, followed by a disablement of secure boot, followed by an attempt to perform a legacy boot;

(c) a selection of a Secure Digital (SD) boot option, a Thunderbolt boot option, or a Universal Serial Bus (USB) boot option from a boot list, followed by an addition of a boot device to the boot list;

(d) a disablement of boot path security, followed by at least one of: a disablement of a secure boot, or an attempt to perform a legacy boot;

(e) a disablement of a BIOS integrity check, followed by an enablement of BIOS downgrade, followed by a firmware update, followed by a disablement of BIOS auto-recovery;

(f) a bypass of a physical presence requirement for a Trusted Platform Module (TPM), followed by an a TPM operation;

(g) an allowance of a TPM clearing operation, followed by at least one of: an allowance of a local TPM activation, or an allowance of a remote TPM activation operation;

(h) an enablement an auto-on feature, an auto-on wake-on-Local Area Network (LAN) feature, an USB-wake feature, or a wake-on-Dock feature, followed by at least one of: (i) an allowance of a BIOS downgrade followed by a firmware update operation, (ii) an allowance of a remote TPM activation operation, or (iii) an allowance of a remote wipe of an internal drive;

(i) an enablement an auto-on feature, an auto-on wake-on-LAN feature, an USB-wake feature, or a wake-on-Dock feature, followed by at least one of: (i) an allowance of a BIOS downgrade followed by a firmware update operation, or (ii) an allowance of a remote TPM activation operation;

(j) an enablement a microphone or camera, followed by an enablement of an auto-on microphone or camera setting;

(k) a change to a minimum length of an admin password, followed by a disablement of a strong password feature, followed by an admin password change;

(l) an admin password change, followed by an enablement of an admin setup lockout feature; or (m) a removal of an intrusion warning, followed by a chassis intrusion reset.

19. The method of claim 17, wherein the chain of BIOS/UEFI configuration changes comprises an indication of at least one of:

(a) a disablement of BIOS signing, followed by an enablement of BIOS downgrade, followed by a disablement of BIOS auto-recovery, followed by an enablement of BIOS auto-recovery, followed by a disablement of BIOS downgrade, and followed by an enablement of BIOS signing;

(b) a selection of a legacy boot option from a boot list, followed by a disablement of secure boot, followed by an attempt to perform a legacy boot;

(c) a selection of a Secure Digital (SD) boot option, a Thunderbolt boot option, or a Universal Serial Bus (USB) boot option from a boot list, followed by an addition of a boot device to the boot list;

(d) a disablement of boot path security, followed by at least one of: a disablement of a secure boot, or an attempt to perform a legacy boot;

(e) a disablement of a BIOS integrity check, followed by an enablement of BIOS downgrade, followed by a firmware update, followed by a disablement of BIOS auto-recovery;

(f) a bypass of a physical presence requirement for a Trusted Platform Module (TPM), followed by an a TPM operation;

(g) an allowance of a TPM clearing operation, followed by at least one of: an allowance of a local TPM activation, or an allowance of a remote TPM activation operation;

(h) an enablement an auto-on feature, an auto-on wake-on-LAN feature, an USB-wake feature, or a wake-on-Dock feature, followed by at least one of: (i) an allowance of a BIOS downgrade followed by a firmware update operation, (ii) an allowance of a remote TPM activation operation, or (iii) an allowance of a remote wipe of an internal drive;

(i) an enablement an auto-on feature, an auto-on wake-on-LAN feature, an USB-wake feature, or a wake-on-Dock feature, followed by at least one of: (i) an allowance of a BIOS downgrade followed by a firmware update operation, or (ii) an allowance of a remote TPM activation operation;

(j) an enablement a microphone or camera, followed by an enablement of an auto-on microphone or camera setting;

(k) a change to a minimum length of an admin password, followed by a disablement of a strong password feature, followed by an admin password change;

(l) an admin password change, followed by an enablement of an admin setup lockout feature; or (n) a clearing of an intrusion warning, followed by a chassis intrusion reset.

* * * * *